United States Patent
Huang et al.

(10) Patent No.: US 11,912,006 B2
(45) Date of Patent: Feb. 27, 2024

(54) CONTINUOUS MANUFACTURING EQUIPMENT OF ELASTIC THREE-DIMENSIONAL FABRIC AND CONTINUOUS MANUFACTURING METHOD THEREOF

(71) Applicant: TAIWAN TEXTILE FEDERATION, R.O.C., Taipei (TW)

(72) Inventors: Shu-Hui Huang, Taipei (TW); Hung-Kung Chien, Taipei (TW); Yu-Han Tsai, Taipei (TW)

(73) Assignee: TAIWAN TEXTILE FEDERATION, R.O.C., Taipei (TW)

( * ) Notice: Subject to any disclaimer, the term of this patent is extended or adjusted under 35 U.S.C. 154(b) by 38 days.

(21) Appl. No.: 17/740,971

(22) Filed: May 10, 2022

(65) Prior Publication Data
US 2023/0364897 A1 Nov. 16, 2023

(51) Int. Cl.
| | |
|---|---|
| B32B 37/00 | (2006.01) |
| B32B 38/00 | (2006.01) |
| B32B 38/04 | (2006.01) |
| B32B 37/10 | (2006.01) |
| B32B 37/06 | (2006.01) |
| B32B 38/18 | (2006.01) |

(52) U.S. Cl.
CPC ......... *B32B 37/0053* (2013.01); *B32B 37/06* (2013.01); *B32B 37/10* (2013.01); *B32B 38/0004* (2013.01); *B32B 38/04* (2013.01); *B32B 38/1825* (2013.01); *B32B 2038/045* (2013.01)

(58) Field of Classification Search
None
See application file for complete search history.

(56) References Cited

U.S. PATENT DOCUMENTS

| | | | | |
|---|---|---|---|---|
| 2001/0037851 | A1* | 11/2001 | Mortellite | B65H 39/16 156/244.11 |
| 2013/0012899 | A1* | 1/2013 | Fenske | B32B 5/022 156/187 |
| 2015/0050462 | A1* | 2/2015 | Schroer, Jr. | A61F 13/15658 428/188 |
| 2017/0225371 | A1* | 8/2017 | Thai | B29C 70/545 |

* cited by examiner

*Primary Examiner* — Michael N Orlando
*Assistant Examiner* — Abhishek A Patwardhan
(74) *Attorney, Agent, or Firm* — Chun-Ming Shih; HDLS IPR SERVICES

(57) ABSTRACT

A continuous manufacturing equipment of an elastic three-dimensional fabric and a continuous manufacturing method thereof are disclosed. The continuous manufacturing equipment includes: a film conveying device having a thermal melting film and a conveying mechanism; a cutting device used for cutting a plurality of cutting gaps on the thermal melting film; a first fabric laminating device adhering an outer fabric on one surface of the thermal melting film; and a second fabric laminating device adhering an elastic fabric on another surface of the thermal melting film in a manner of elastically stretching and then elastically recovering. As such, effects of automatic, continuous, and simple steps in manufacturing and having a high yield rate are provided.

5 Claims, 6 Drawing Sheets

… …

CONTINUOUS MANUFACTURING EQUIPMENT OF ELASTIC THREE-DIMENSIONAL FABRIC AND CONTINUOUS MANUFACTURING METHOD THEREOF

BACKGROUND OF THE DISCLOSURE

Technical Field

The present disclosure relates to a manufacturing equipment of a fabric and a continuous manufacturing method thereof, particularly to a continuous manufacturing equipment of an elastic three-dimensional fabric and a continuous manufacturing method thereof

Description of Related Art

A related-art three-dimensional fabric having elasticity is commonly applied in various textiles, for example clothing, shoes, bags, domestic decorations, and the interior decorations of a vehicle, to enhance and express the personal style. The three-dimensional fabric having elasticity is manufactured through a male mold and a female mold being thermally pressed for formation.

However, the molding formation method has disadvantages as follows. The production cost is high because the male mold and the female mold are required. An automated continuous manufacturing may not be provided. The fabric surface of finished product is hard and a comfortable touching feeling may not be provided. Defects and pressed marks are easily formed and the elastic recovering rate is poor. The finished product may be deformed after being stretched and water washed.

Accordingly, the applicant of the present disclosure has devoted himself for improving the mentioned disadvantages.

SUMMARY OF THE DISCLOSURE

The present disclosure is to provide a continuous manufacturing equipment of an elastic three-dimensional fabric and a continuous manufacturing method thereof. As such, the elastic three-dimensional fabric may be automatically and continuously manufactured with the continuous manufacturing equipment and the continuous manufacturing method to achieve effects of automatic, continuous, and simple steps in manufacturing and having a high yield rate.

Accordingly, the present disclosure provides a continuous manufacturing equipment of an elastic three-dimensional fabric, which includes: a film conveying device, having a thermal melting film and a conveying mechanism used for sequentially conveying the thermal melting film to pass a processing zone, a first laminating zone and a second laminating zone; a cutting device, disposed in the processing zone and used for cutting a plurality of cutting gaps on the thermal melting film; a first fabric laminating device, disposed in the first laminating zone and having a first feeding wheel, a first thermal pressing wheel and an outer fabric, one end of the outer fabric is reeled in the first feeding wheel and another end thereof is stacked on the thermal melting film to be thermally laminated via the first thermal pressing wheel to adhere the outer fabric on one surface of the thermal melting film; and a second fabric laminating device, disposed in the second laminating zone, and having a second feeding wheel, a second thermal pressing wheel, a drive wheel and an elastic fabric, one end of the elastic fabric is reeled in the second feeding wheel and another end thereof is stacked on the thermal melting film to be thermally laminated via the second thermal pressing wheel, the drive wheel is disposed between the second feeding wheel and the second thermal pressing wheel and abuts against the elastic fabric, a rotation speed of the second thermal pressing wheel is greater than a rotation speed of the drive wheel to adhere the elastic fabric on another surface of the thermal melting film in a manner of elastically stretching and then elastically recovering.

Accordingly, the present disclosure provides a continuous manufacturing method of an elastic three-dimensional fabric, which includes steps of: a) providing a film conveying device, having a thermal melting film and a conveying mechanism used for sequentially conveying the thermal melting film to pass a processing zone, a first laminating zone and a second laminating zone; b) providing a cutting device, disposed in the processing zone and used for cutting a plurality of cutting gaps on the thermal melting film to form a pattern texture between the plurality of the cutting gaps on the thermal melting film, and each of the cutting gaps having a slit; d) providing a first fabric laminating device, disposed in the first laminating zone and having a first feeding wheel, a first thermal pressing wheel and an outer fabric, one end of the outer fabric being reeled in the first feeding wheel and another end thereof being stacked on the thermal melting film to be thermally laminated via the first thermal pressing wheel to adhere the outer fabric on one surface of the thermal melting film; e) providing a second fabric laminating device, disposed in the second laminating zone, and having a second feeding wheel, a second thermal pressing wheel, a drive wheel and an elastic fabric, one end of the elastic fabric being reeled in the second feeding wheel and another end thereof being stacked on the thermal melting film to be thermally laminated via the second thermal pressing wheel, the drive wheel being disposed between the second feeding wheel and the second thermal pressing wheel and abutting against the elastic fabric, a rotation speed of the second thermal pressing wheel being greater than a rotation speed of the drive wheel to adhere the elastic fabric on another surface of the thermal melting film in a manner of elastically stretching and then elastically recovering; and f) the elastic fabric being elastically recovered after being released from the second thermal pressing wheel to drive the slit of each of the cutting gaps to be shrunk, thus the elastic fabric being formed with a flat surface adhered on the pattern texture and arranged corresponding to the plurality of cutting gaps, and the outer fabric being formed with a flat adhering part adhered on the pattern texture and a plurality of three-dimensional embossed patterns arranged corresponding to the plurality of cutting gaps and protruding through each of the slits being shrunk.

Based on what has been disclosed above, with the continuous manufacturing equipment of the elastic three-dimensional fabric and the continuous manufacturing method thereof provided by the present disclosure, and a mold-less formation is achieved, the continuous manufacturing equipment and the continuous manufacturing method are provided with effects of being automatic, continuous, and simple steps in manufacturing and having a high yield rate.

Based on what has been disclosed above, advantages achieved by the present disclosure are as follows. There is no mold pressed mark or defect formed on the elastic three-dimensional fabric provided by the present disclosure. The thermal melting film may still be tightly adhered with the outer fabric and the elastic fabric after being washed with water of a temperature equal to or lower than 40° C. The stretching recovery rate of the thermal melting film itself is high and the peeling strength after being adhered may reach a value equal to or more than 2 Kg/cm$^2$, thus the elastic three-dimensional fabric is provided with advantages of increasing the three-dimensional level and having a desirable elastic recovering rate.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION OF THE DISCLOSURE

Figure 1:
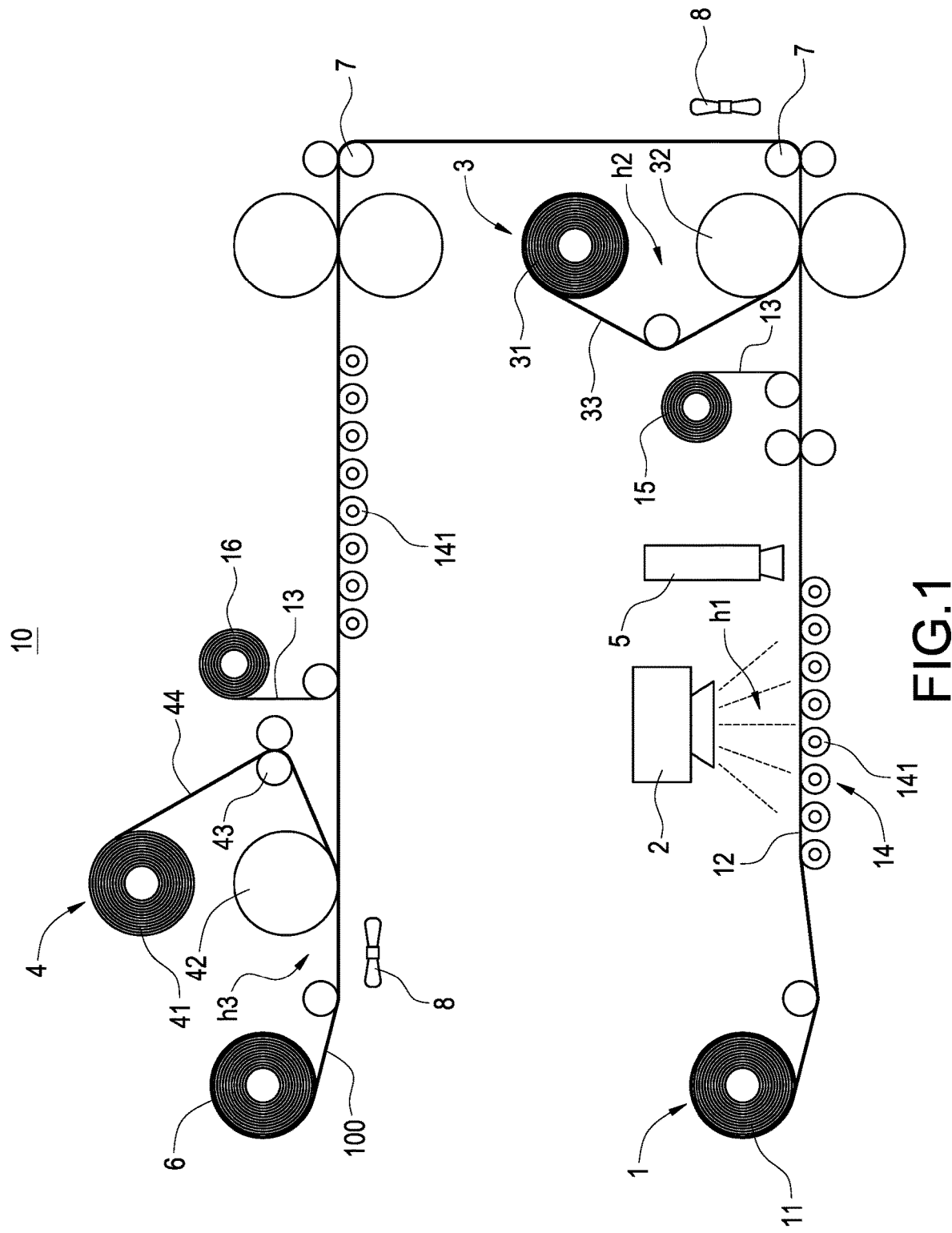
FIG. 1 is a block diagram showing the continuous manufacturing equipment according to the present disclosure.

The technical contents of this disclosure will become apparent with the detailed description of embodiments accompanied with the illustration of related drawings as follows. It is intended that the embodiments and drawings disclosed herein are to be considered illustrative rather than restrictive.

Please refer from FIG. 1 to FIG. 4, the present disclosure provides a continuous manufacturing equipment of an elastic three-dimensional fabric and a continuous manufacturing method thereof. The continuous manufacturing equipment 10 mainly includes a film conveying device 1, a cutting device 2, a first fabric laminating device 3 and a second fabric laminating device 4.

Figure 2:
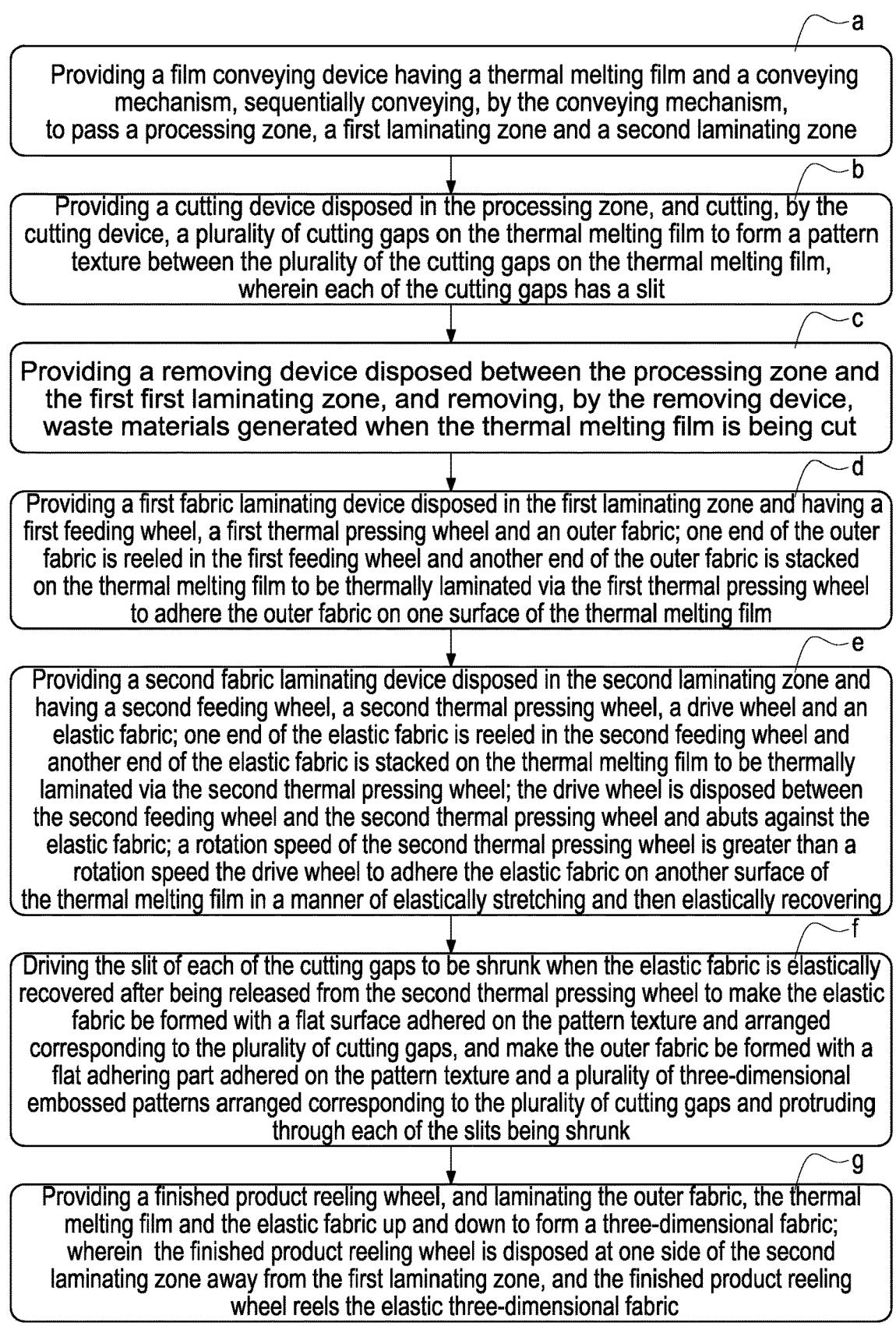
FIG. 2 is a flowchart showing the continuous manufacturing method according to the present disclosure.

Please refer to FIG. 2, which discloses the continuous manufacturing method of the elastic three-dimensional fabric 100. Firstly, as shown in a) of FIG. 2 and FIG. 1, a film conveying device 1 is provided. The film conveying device 1 has a thermal melting film 12 and a conveying mechanism 14. The thermal melting film 12 sequentially passes a processing zone h1, a first laminating zone h2 and a second laminating zone h3 via the conveying mechanism 14.

Moreover, the film conveying device 1 further has a film roller 11. One end of the thermal melting film 12 is reeled in the film roller 11 and another end thereof is conveyed via the conveying mechanism 14. In some embodiments, the conveying mechanism 14 has a plurality of conveying wheel sets 141, but here is not intended to be limiting.

The thermal melting film 12 is made of the material such as thermoplastic polyurethanes (TPU) or ethylene vinyl acetate (EVA). The thermal melting film 12 is an adhesive which is melted when being heated and solidified when being cooled. The thermal melting film 12 has a desirable adhering strength under a proper temperature. An extending rate of the thermal melting film is 100% to 500%.

Figure 3:
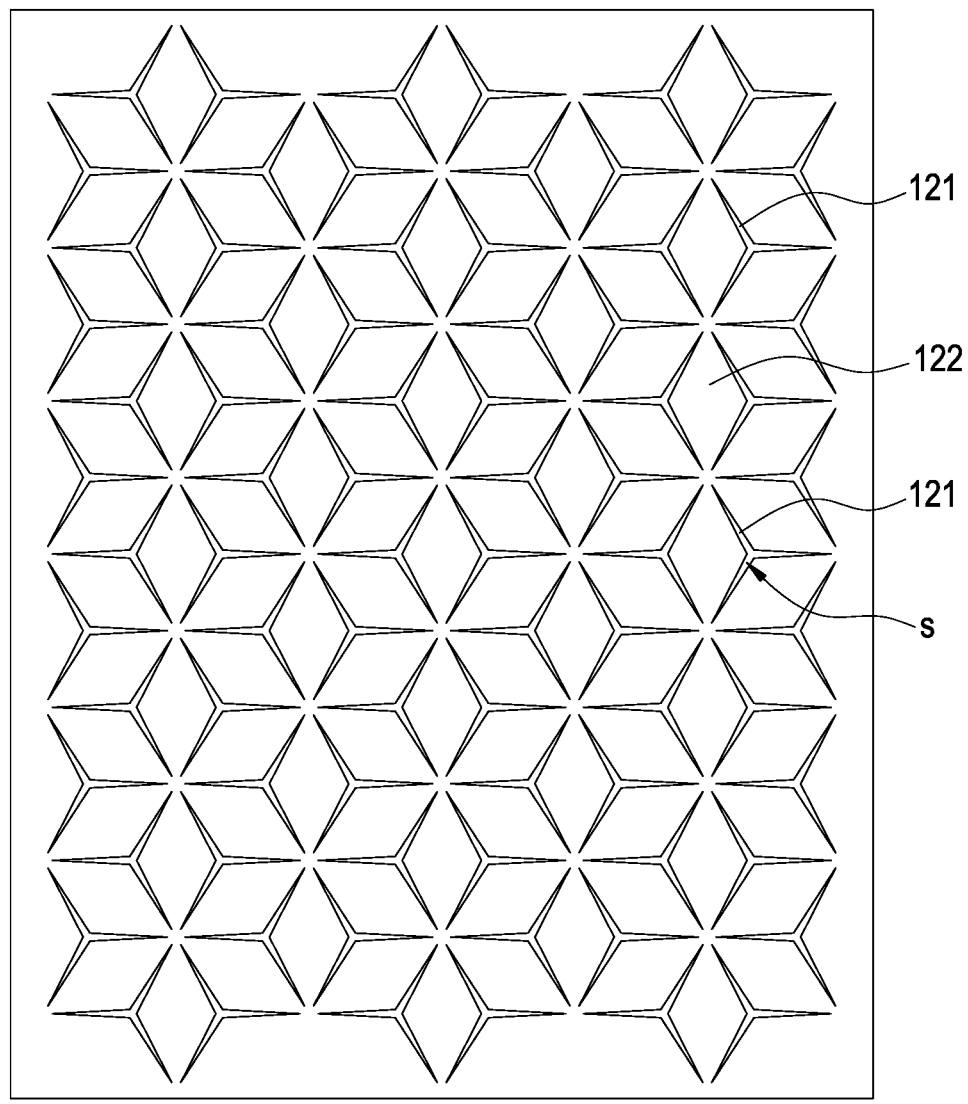
FIG. 3 is a top view showing the thermal melting film according to the present disclosure.

Secondly, as shown in b) of FIG. 2 and FIG. 1 and FIG. 3, a cutting device 2 is provided. The cutting device 2 is disposed in the processing zone h1. The thermal melting film 12 is cut to form a plurality of cutting gaps 121 via the cutting device 2, thus the thermal melting film 12 has a pattern texture 122 disposed between the plurality of cutting gaps 121. Each of the cutting gaps 121 has a slit s. The cutting device 2 is a laser cutting device or a rolling cutting device.

Thirdly, as shown in c) of FIG. 2 and FIG. 1, a removing device 5 is provided. The removing device 5 is disposed between the processing zone h1 and the first laminating zone h2. Waste materials generated when the thermal melting film 12 is cut by the cutting device 2 are removed via the removing device 5.

Fourthly, as shown in d) of FIG. 2 and FIG. 1, a first fabric laminating device 3 is provided. The first fabric laminating device 3 is disposed in the first laminating zone h2. The first fabric laminating device 3 has a first feeding wheel 31, a first thermal pressing wheel 32 and an outer fabric 33. One end of the outer fabric 33 is reeled in the first feeding wheel 31 and another end thereof is stacked on the thermal melting film 12 to be thermally pressed via the first thermal pressing wheel 32, thus the thermal melting film 12 has a heat reactivity to be adhered with the outer fabric 33, and the outer fabric 33 is adhered on one surface of the thermal melting film 12.

Fifthly, as shown in e) of FIG. 2 and FIG. 1, a second fabric laminating device 4 is provided. The second fabric laminating device 4 is disposed in the second laminating zone h3. The second fabric laminating device 4 has a second feeding wheel 41, a second thermal pressing wheel 42, a drive wheel 43 and an elastic fabric 44. One end of the elastic fabric 44 is reeled in the second feeding wheel 41 and another end thereof is stacked on the thermal melting film 12 to be thermally pressed via the second thermal pressing wheel 42. The drive wheel 43 is disposed between the second feeding wheel 41 and the second thermal pressing wheel 42 and abuts against the elastic fabric 44. A rotation speed of the second thermal pressing wheel 42 is greater than a rotation speed of the drive wheel 43, thus the elastic fabric 44 is first elastically stretched and then elastically recovered to be adhered on another surface of the thermal melting film 12.

With the difference between the rotation speed of the second thermal pressing wheel 42 and the rotation speed of the drive wheel 43, the elastic fabric 44 is stretched to be an extending rate equal to or more than 20%, in other words a length of the elastic fabric 44 is stretched to 1.2 times longer than an original length of the elastic fabric 44, and the stretched elastic fabric 44 is adhered on another surface of the thermal melting film 12.

Moreover, a melting point of the thermal melting film 12 is 80° C. to 180° C. The thermal melting film 12 and the outer fabric 33 laminated up and down are processed with a thermal pressing operation with a thermal pressing pressure of 4 to 10 Kg/cm$^2$, a thermal pressing time of 5 to 30 sec and a thermal pressing temperature of 120° C. to 180° C. through the first thermal pressing wheel 32. The thermal melting film 12 and the stretched elastic fabric 44 laminated up and down are processed with a thermal pressing operation with a thermal pressing pressure of 4 to 10 Kg/cm$^2$, a thermal pressing time of 5 to 30 sec and a thermal pressing temperature of 120° C. to 180° C. through the second thermal pressing wheel 42, thus the thermal melting film 12 is heated and melted to slightly penetrate into an inner surface of the outer fabric 33 and an inner surface of the stretched elastic fabric 44 to make the outer fabric 33, the thermal melting film 12 and the stretched elastic fabric 44 be tightly adhered with each other.

In addition, a thickness of the thermal melting film 12 is 0.05 to 0.2 mm to prevent the thermal melting film 12 from being too thin to achieve an adhering function. If the thermal melting film 12 is overly thick, the thermal melting film 12 may leak out to an outer surface of the outer fabric 33 and an outer surface of the stretched elastic fabric 44.

Figure 4:
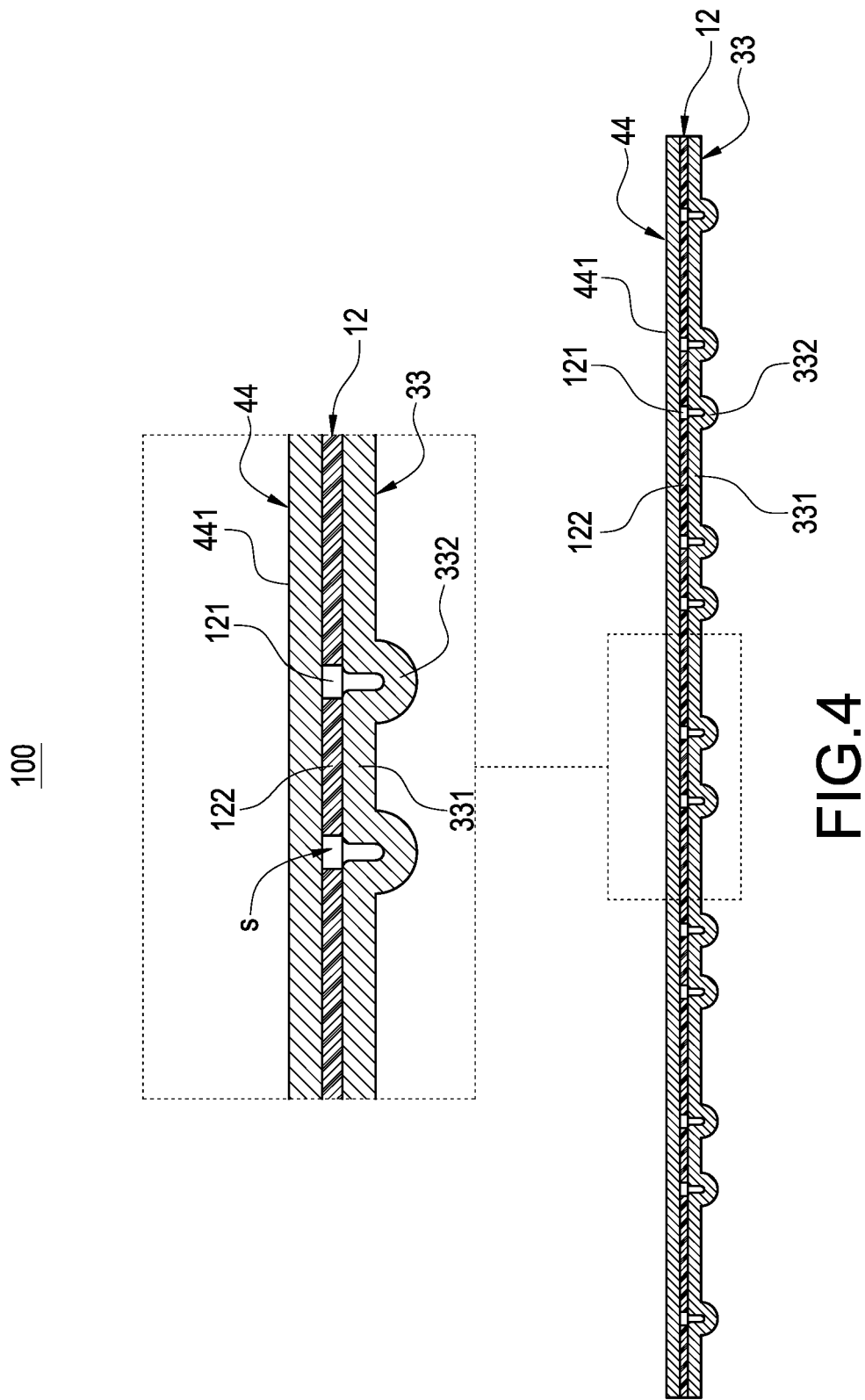
FIG. 4 is a schematic view showing the outer fabric being formed with the flat adhering part and a plurality of three-dimensional embossed patterns according to the present disclosure.

Sixthly, as shown in 0 of FIG. 2 and FIG. 1 and FIG. 4, the elastic fabric 44 is elastically recovered after being released from the second thermal pressing wheel 42 to drive the slit s of each of the cutting gaps 121 to be shrunk, thus the elastic fabric 44 is formed with a flat surface 441 adhered on the pattern texture 122 and arranged corresponding to the plurality of cutting gaps 121, and the outer fabric 33 is formed with a flat adhering part 331 adhered on the pattern texture 122 and a plurality of three-dimensional embossed patterns 332 arranged corresponding to the plurality of cutting gaps 121 and protruding through each of the slits s being shrunk.

Details are provided as follows. The elastic fabric 44 is elastically recovered from the stretched status to the original status after the elastic fabric 44 is released from the second thermal pressing wheel 42, the elastic fabric 44 is formed with the flat surface 441 adhered on the pattern texture 122 and arranged corresponding to the plurality of cutting gaps 121, thus the elastic fabric 44 and the pattern texture 122 of the thermal melting film 12 are adhered and fixed. The elastic fabric 44 may only be elastically recovered through the slits s of the plurality of cutting gaps 121, and the slit s of each of the cutting gaps 121 is driven to be shrunk.

In addition, the outer fabric 33 is adhered and fixed with the pattern texture 122 of the thermal melting film 12, when the slit s of each of the cutting gaps 121 is shrunk, the flat adhering part 331 of the outer fabric 33 is in a surface flattening status due to being adhered and fixed with the pattern texture 122, and the plurality of three-dimensional embossed patterns 332 of the outer fabric 33 are outwardly protruded because each of the slits s is shrunk.

As such, the elastic fabric 44 is firstly elastically stretched and then elastically recovered to be adhered on the another surface of the thermal melting film 12 to make the slit s of each of the cutting gaps 121 be shrunk, thus the outer fabric 33 having the plurality of three-dimensional embossed patterns 332 is formed.

Seventhly, as shown in g) of FIG. 2 and FIG. 1, a finished product reeling wheel 6 is provided. The outer fabric 33, the thermal melting film 12 and the elastic fabric 44 are laminated up and down to form the three-dimensional fabric 100. The finished product reeling wheel 6 is disposed at one side of the second laminating zone h3 away from the first laminating zone h2. The finished product reeling wheel 6 is used for reeling the elastic three-dimensional fabric 100.

Moreover, the film conveying device 1 further has two release papers 13 adhered on a top surface and a bottom surface of the thermal melting film 12, a first recycling roller 15 disposed between the removing device 5 and the first thermal pressing wheel 32, and a second recycling roller 16 disposed between the first thermal pressing wheel 32 and the second thermal pressing wheel 42. One end of one of the release papers 13 is reeled in the film roller 11 and another end thereof is reeled in the first recycling roller 15, thus the thermal melting film 12 is adhered and fixed with the outer fabric 33 after the release paper 13 on one surface of the thermal melting film 12 is peeled off. One end the other release paper 13 is reeled in the film roller 11 and another end thereof is reeled in the second recycling roller 16, thus the thermal melting film 12 is adhered and fixed with the elastic fabric 44 after the release paper 13 on another surface of the thermal melting film 12 is peeled off.

In addition, the continuous manufacturing equipment 10 of the present disclosure further includes a plurality of direction turning wheels 7 used for turning a moving direction of the thermal melting film 12 and the outer fabric 3 which are mutually laminated, and a plurality of fans 8. The fans are disposed between the first thermal pressing wheel 32 and the second thermal pressing wheel 42 and arranged corresponding to the thermal melting film 12 and the outer fabric 33 which are mutually laminated, and disposed between the second thermal pressing wheel 42 and the finished product rolling wheel 6 and arranged corresponding to the elastic three-dimensional fabric 100. The fan 8 is used for generating an airflow to cool the thermal melting film 12.

Accordingly, the elastic three-dimensional fabric 100 may be continuously manufactured with the continuous manufacturing equipment 10 and the continuous manufacturing method provided by the present disclosure, and a mold-less formation is achieved, the continuous manufacturing equipment 10 and the continuous manufacturing method are provided with effects of being automatic, continuous, and simple steps in manufacturing and having a high yield rate.

Moreover, advantages achieved by the present disclosure are as follows. There is no mold pressed mark or defect formed on the elastic three-dimensional fabric 100 provided by the present disclosure. The thermal melting film 12 may still be tightly adhered with the outer fabric 33 and the elastic fabric 44 after being washed with water of a temperature equal to or lower than 40° C. The stretching recovery rate of the thermal melting film 12 itself is high and the peeling strength after being adhered may reach a value equal to or more than 2 $Kg/cm^2$, thus the elastic three-dimensional fabric 100 is provided with advantages of increasing the three-dimensional level and having a good elastic recovering rate.

Figure 5:
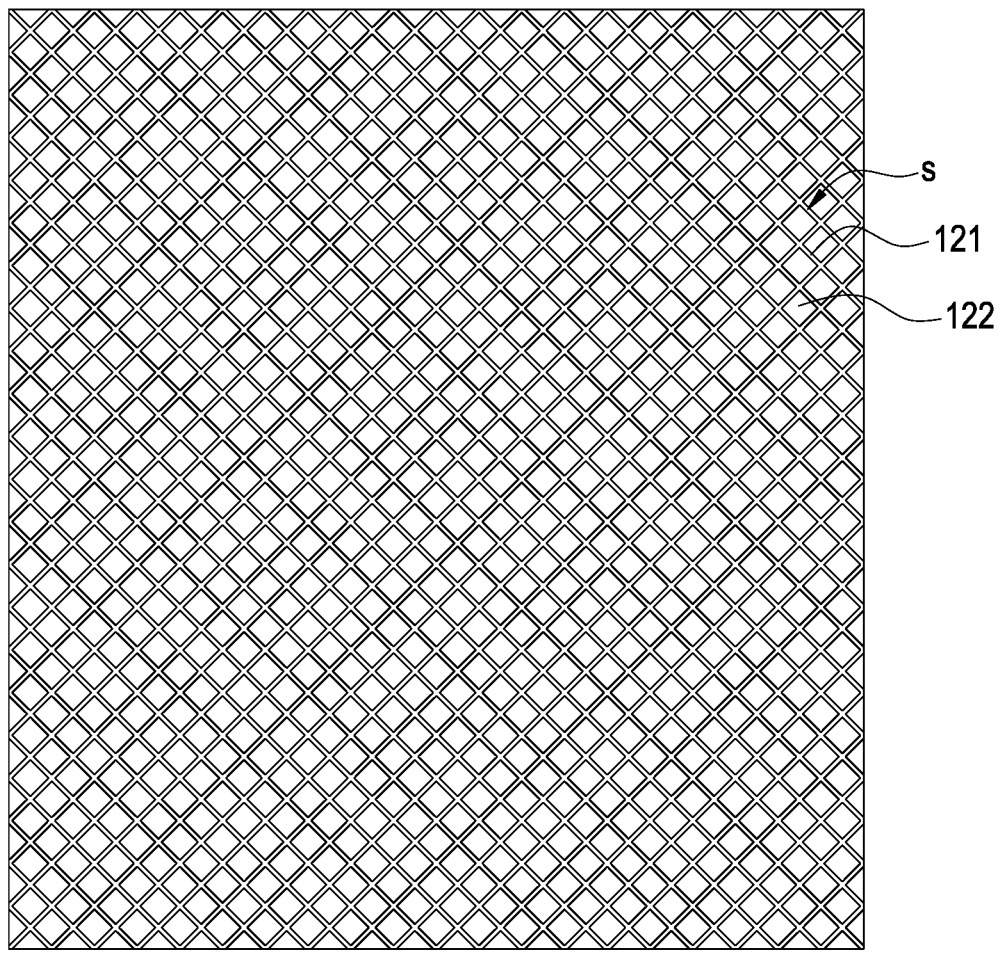
FIG. 5 is a top view showing the thermal melting film according to another embodiment of the present disclosure.
Figure 6:
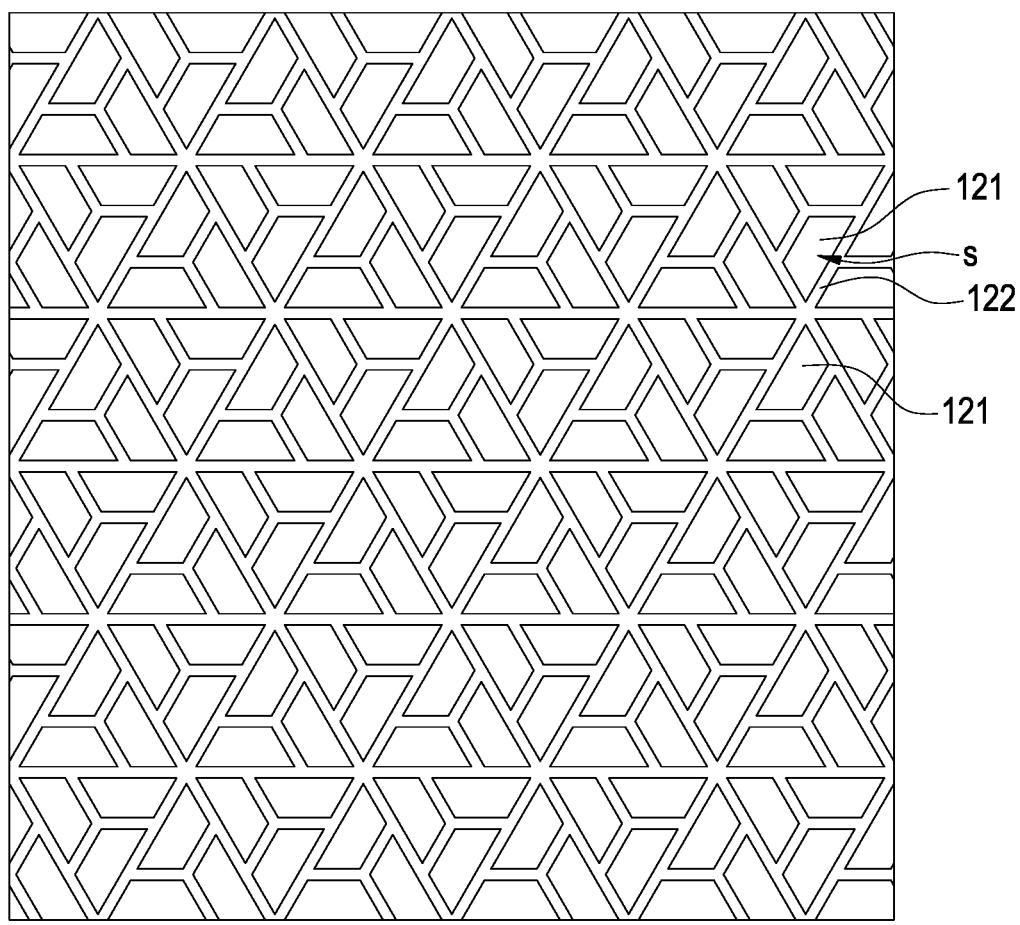
FIG. 6 is a top view showing the thermal melting film according to one another embodiment of the present disclosure.

Please refer to FIG. 5 and FIG. 6, which disclose another embodiment and one another embodiment of the thermal melting film 2 provided by the present disclosure. The another embodiment and the one another embodiment disclosed in FIG. 5 and FIG. 6 are substantially the same as the embodiment disclosed in FIG. 3. The difference between the another embodiment and the one another embodiment disclosed in FIG. 5 and FIG. 6 and the embodiment disclosed in FIG. 3 is the pattern design of the pattern texture 122. The pattern texture 122 shown in FIG. 3 is composed of a plurality of rhombus-shaped surfaces being arranged in parallel, the pattern texture 122 shown in FIG. 5 is composed of a plurality of rhombus-shaped points being arranged in parallel, and the pattern texture 122 shown in FIG. 6 is composed of a plurality of linear lines being staggeringly arranged to form triangular and trapezoidal shapes, but here is not intended to be limiting. The pattern texture 122 may be composed of any geometrical shapes, for example points, lines and surfaces, or a combination of the above.

While this disclosure has been described by means of specific embodiments, numerous modifications and variations could be made thereto by those skilled in the art without departing from the scope and spirit of this disclosure set forth in the claims.

What is claimed is:

1. A continuous manufacturing equipment of an elastic three-dimensional fabric, the equipment comprising:

a film conveying device, comprising a thermal melting film and a conveying mechanism configured to sequentially convey the thermal melting film to pass a processing zone, a first laminating zone and a second laminating zone;

a cutting device, disposed in the processing zone and configured to cut a plurality of cutting gaps on the thermal melting film;

a first fabric laminating device, disposed in the first laminating zone and comprising a first feeding wheel, a first thermal pressing wheel and a first fabric, wherein one end of the first fabric is reeled in the first feeding wheel and another end of the first fabric is stacked on the thermal melting film to be thermally laminated via the first thermal pressing wheel to adhere the first fabric on one surface of the thermal melting film;

a second fabric laminating device, disposed in the second laminating zone, and comprising a second feeding wheel, a second thermal pressing wheel, a drive wheel and a second fabric, wherein one end of the second fabric is reeled in the second feeding wheel and another end of the second fabric is stacked on the thermal melting film to be thermally laminated via the second thermal pressing wheel, the drive wheel is disposed between the second feeding wheel and the second thermal pressing wheel and abuts against the second fabric, a rotation speed of the second thermal pressing wheel is greater than a rotation speed of the drive wheel to adhere the second fabric on another surface of the thermal melting film in a manner of elastically stretching and then elastically recovering; and a removing device, disposed between the cutting device and the first thermal laminating wheel, and configured to remove waste materials generated when the thermal melting film is cut, wherein the cutting device comprises a laser cutting device or a rolling cutting device.

2. The continuous manufacturing equipment according to claim 1, wherein the thermal melting film comprises a pattern texture disposed between the plurality of cutting gaps, each of the cutting gaps comprises a slit, the second fabric is elastically recovered after being released from the second thermal pressing wheel to drive the slit of each of the cutting gaps to be shrunk to make the second fabric be formed with a flat surface adhered on the pattern texture and arranged corresponding to the plurality of cutting gaps, and make the first fabric be formed with a flat adhering part adhered on the pattern texture and a plurality of three-dimensional embossed patterns arranged corresponding to the plurality of cutting gaps and protruding through each of the slits being shrunk.

3. The continuous manufacturing equipment according to claim 1, further comprising a finished product reeling wheel, wherein the first fabric, the thermal melting film and the second fabric are laminated up and down to be the elastic three-dimensional fabric, the finished product reeling wheel is disposed at one side of the second laminating zone away from the first laminating zone, and the finished product reeling wheel is configured to reel the elastic three-dimensional fabric.

4. The continuous manufacturing equipment according to claim 1, wherein the film conveying device further comprises a film roller, one end of the thermal melting film is reeled in the film roller and another end of the thermal melting film is conveyed via the conveying mechanism, and the conveying mechanism comprises a plurality of conveying wheel sets.

5. The continuous manufacturing equipment according to claim 4, wherein the film conveying device further comprises two release papers adhered on a top surface and a bottom surface of the thermal melting film, a first recycling roller disposed between the removing device and the first thermal pressing wheel, and a second recycling roller disposed between the first thermal pressing wheel and the second thermal pressing wheel, one end of one of the release papers is reeled in the film roller and another end of the one of the release papers is reeled in the first recycling roller, and one end of another release paper is reeled in the film roller and another end of the another release paper is reeled in the second recycling roller.

\* \* \* \* \*